United States Patent Office 3,423,174
Patented Jan. 21, 1969

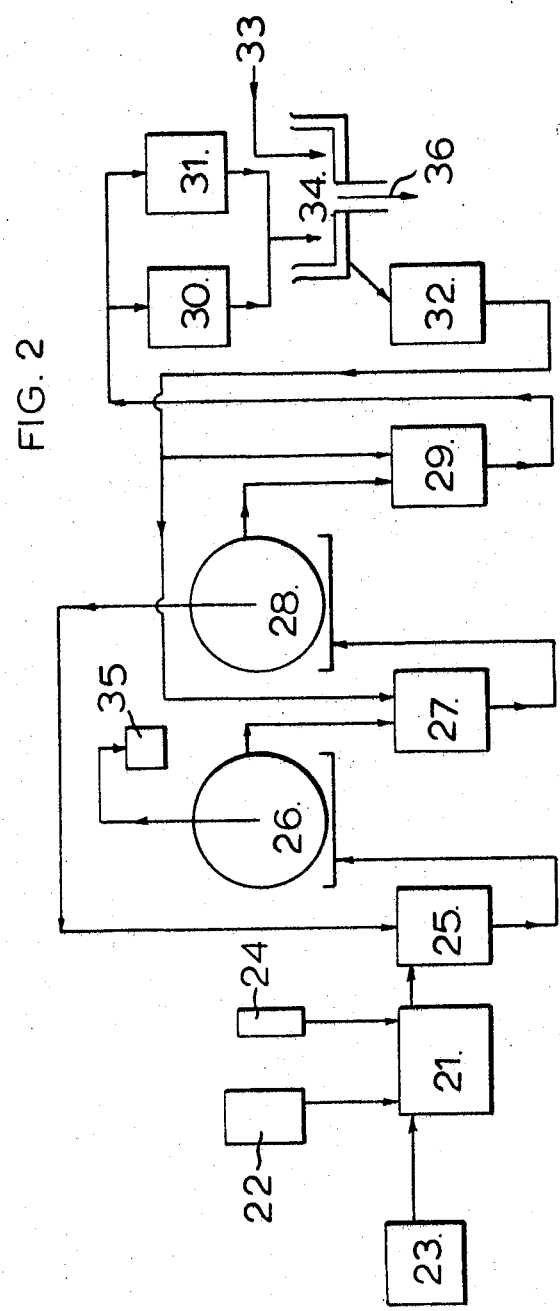

3,423,174
PRODUCTION OF SULPHAMIC ACID
Austen Edgar Sowerby, Distington, Cumberland, England, assignor to Marchon Products Limited, London, England, a British company
Filed Dec. 21, 1965, Ser. No. 515,392
Claims priority, application Great Britain, Dec. 22, 1964, 52,045
U.S. Cl. 23—166
Int. Cl. C01b 21/54
8 Claims

ABSTRACT OF THE DISCLOSURE

An improved process for producing sulphamic acid by a continuous reaction of urea, sulphur trioxide, and sulphuric acid, at a temperature between 40° C. and 100° C. The rates of admission of the three reactants and the rate of withdrawal are controlled to meet the following criteria: The (a) concentration of urea in the reactor is maintained at less than 2% of the total weight of the material in the reactor, (b) the sulphur trioxide is supplied in a proportion of $$\left(E+\frac{T}{80}\right)$$

Figure 1:
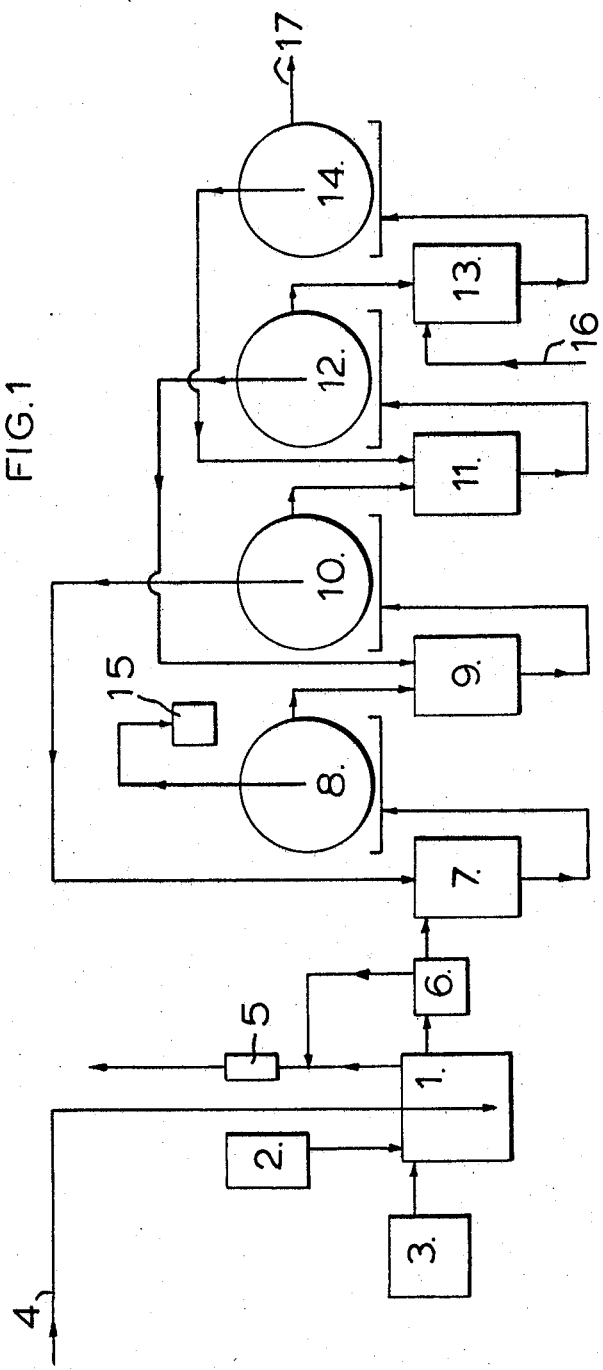

moles per mole of urea, where E is a number between 0.30 and 1.15 and T is the numerical value of the centigrade temperature in the reactor, and the values of E and T are chosen so that $$\left(E+\frac{T}{80}\right)$$

is greater than one (c) the sulphuric acid is supplied in a sufficient stoichiometric excess to provide a proportion of liquid in the reactor of at least 30% by weight and (d) the mean residence time of material in the reactor is at least 4 hours.

---

The present invention relates to improvements in the production of sulphamic acid.

It is known to react urea, sulphur trioxide and sulphuric acid to form sulphamic acid according to the equation:

$$(NH_2)_2CO + SO_3 + H_2SO_4 \rightarrow 2NH_2HSO_3 + CO_2$$

The conditions under which this reaction might most satisfactorily be conducted to provide a controllable commercial operation have been the subject of much research. Among the difficulties which have had to be overcome are the tendency of the reaction to proceed violently to completion with great evolution of heat, the tendency for side reactions to form undesired by-products such as ammonium bisulphate, and the difficulty of the handling and purification of the product.

It has been proposed to perform the reaction in the absence of a substantial body of liquid, for example in the presence of a large excess of granular solid product. However the sticky solid product so produced is hard to stir, cool and handle. To overcome these difficulties it has been proposed to carry out the reaction in an excess of oleum, for example see U.S. patent specification No. 2,191,754 and U.K. patent specification No. 967,232 but this gives rise to unduly small crystals and consequent slowness of filtration of the resulting viscous slurry, which renders the purification a lengthy and tedious process.

We have discovered that if the process is carried out by admitting oleum and urea continuously to a reactor at such a rate as to maintain the concentration of urea in the reactor at a value of less than 2% of the total weight of material in the reactor, the reaction will proceed smoothly and without violence at temperatures of from 40 to 100° C. To provide a manageable product, an excess of sulphuric acid is employed sufficient to provide, as product, a slurry containing not less than 30% liquid. High yields of sulphamic acid may be ensured by employing a sufficient stoichiometric excess of $SO_3$, whose optimum value depends on the temperature. We have discovered, moreover, that if the mean residence time of material in the continuous reactor is at least 4 hours and preferably up to 100 hours depending on the temperature, high yields of a product having an improved filtration rate may be obtained.

Accordingly our invention consists in a method for the production of sulphamic acid, which comprises: admitting urea, sulphur trioxide, and sulphuric acid continuously to a reactor, withdrawing material continuously therefrom and maintaining the temperature in the reactor between 40 and 100° C., the rates of admission of the three feed materials, and the rate of withdrawal being such that (a) the concentration of urea in the reactor is maintained at less than 2% of the total weight of material in the reactor, (b) the $SO_3$ is supplied in a proportion of $$\left(E+\frac{T}{80}\right)$$

moles per mole urea where E is a number between 0.30 and 1.15, T is the numerical value of the centigrade temperature in the reactor, and the values of E and T are chosen so that $$\left(E+\frac{T}{80}\right)$$

is greater than 1, (c) the sulphuric acid is supplied in a sufficient stoichiometric excess to provide a proportion of liquid in the reactor of at least 30% by weight and (d) the mean residence time of material in the reactor is not less than four hours, and is preferably $$\left(\frac{800R}{9T-320}\right)$$

hours, where R is a number between 2 and 10 and T has the same significance as above.

The constant low concentration of urea in the reactor is an important factor which ensures that the reaction does not become uncontrollable, and which reduces the tendency to side reactions. The preferred concentration of urea is less than 1% by weight.

While the process may be operated at temperatures of from 40 to 100° C. it is preferred to use temperatures between 40 and 80° C. As the temperature is increased, so is the tendency for the yield of sulphamic acid to be lowered by side reactions.

The optimum concentration of $SO_3$ in the reactor and optimum mean residence time in the process according to our invention are dependent on the operating temperature. Althouh an excess of $SO_3$ is necessary to ensure good yields, at a temperature of 40° C. it is preferred to use only a small excess of sulphur trioxide, i.e. sufficient to provide a concentration of $SO_3$ in the reactor greater than 1% but preferably not greater than 5% by weight, and long residence times of 40 to 100 hours in order to obtain a readily filtrable product. At these temperatures the preferred feed rate for $SO_3$ provides 105 to 125% of the stoichiometric amount needed to react with the urea. At higher temperatures e.g. 75°–80° C. the total yield is diminished unless sufficient excess $SO_3$ is employed to provide a concentration of 10 to 20% in the reactor, while shorter residence times of 5 to 10 hours are preferred. Thus the $SO_3$ feed at higher temperature should be from 130 to 215% of the stoichiometric amount required to react with the urea, and preferably 155 to 175%. At intermediate temperatures, it is preferred to use intermediate values of the excess SO₃ and residence time (which values may be interpolated from the above data).

Thus according to an approximate relationship a feed of $$\left(E + \frac{T}{80}\right)$$

moles SO₃ per mole of urea is desirable, where T is the numerical value of the centigrade temperature and E is from 0.30 to 1.15 and preferably from 0.55 to 0.75. The residence time is given by another approximate relationship as $$\left(\frac{800R}{9T-320}\right)$$

hours, where T is the numerical value of the centigrade temperature and R is from 2 to 10 and preferably not more than 5.

Although it has been customary, in the processes hitherto employed for preparing sulphamic acid, to recycle to the reactor the filtrate from the first filtration of the slurry, thereby reusing any unreacted urea, we have discovered that the resulting increase in the concentration of ammonium sulphate in the reactor inhibits the crystallisation of sulphamic acid. Moreover it has been necessary to filter viscous suspensions of sulphamic acid in oleum, which may prove a difficult and dangerous operation.

We therefore prefer, before filtration, to dilute the slurry with water or preferably wash liquor from a subsequent countercurrent washing process, so as to yield a suspension of sulphamic acid in 70–80% H₂SO₄ this renders the subsequent filtration safer and more convenient, and the filtrate is a useful commercial product which may be used for example in the manufacture of phosphoric acid. In this connection an advantage of our process is that the dilution step enables us to prepare slurries having a lower viscosity, for a given solid content, than those hitherto prepared. The reduced viscosity permits the convenient working up of slurries containing a higher proportion of solids than has hitherto been customary, with consequent saving in sulphuric acid consumption. The solids content of the slurry, prior to dilution may be from 30 to 60% by weight, and is preferably 40 to 50%.

The SO₃ and sulphuric acid may be added separately, or as an oleum. The urea may be dissolved in sulphuric acid in a separate vessel to form urea bisulphate, and the solution cooled and admitted to the reactor, together with oleum or SO₃.

When commencing operation it is desirable to fill the reactor with preformed reaction slurry and then to begin supplying the reagents.

We have found it advantageous, where lower temperatures are involved, to mature the product of our process by heating in a second vessel for 8 to 16 hours at 40 to 60° C., thereby substantially completing the reaction and minimising wastage of urea.

However at higher temperature, for example 70 to 80° C., the maturing process is not normally necessary.

The invention is illustrated by the following examples of which Examples I and II are described with reference to FIG. 1, and Example II with reference to FIG. 2. FIG. 1 is a diagrammatic flow chart illustrating plant suitable for performing the method of our invention at low temperatures while FIG. 2 is a similar chart illustrating plant suitable for performing our invention at higher temperatures. Unless otherwise stated all parts and percentages are by weight.

Example I (with reference to FIG. 1)

Into a stirred and cooled reactor 1, maintained at a temperature of 40° C. and containing pre-formed reaction slurry were metered continuously 100 parts/hour of urea 2 and 800 parts/hour of 20% oleum 3. The capacity of the reaction vessel was such that the mean residence time of the reactants therein was 96 hours and the content of unreacted urea was 0.9% of the total weight of material in the reactor. Carbon dioxide formed in the reaction was scrubbed to remove sulphur trioxide by passing through on oleum tower 5 before being released to atmosphere. The reaction slurry overflowed continuously into a second stirred vessel 6 wherein it was heated to 60° C. to complete the reaction of the urea, the mean residence time in this vessel being eight hours. From this vessel the substantially completely reacted slurry overflowed into a vessel 7 equipped with a stirrer and heat exchanger and was diluted therein with filtrate from the second rotary vacuum filter 10. The diluted slurry had a filtration rate of 2.44 gms./cm.²/minute. From the dilution vessel the slurry was pumped to the first rotary vacuum filter 8 and the filtrate therefrom, 728 parts/hour containing 70% of H₂SO₄ and 0.2% of dissolved sulphanic acid was pumped to storage 15 for sale. The filter cake, containing 8.1% of H₂SO₄ and 6.43% of water, was fed continuously into the first reslurrying vessel 9 wherein it was dispersed in a continuous flow of cold filtrate from the third rotary vacuum filter 12. The mean residence time in this vessel, as in reslurrying vessels 11 and 13, was eight hours. Slurry containing about 60% of suspended solids from vessel 9 was pumped continuously to the second rotary vecuum filter 10 and the cake produced containing 0.73% of H₂SO₄ and 8.22% of water, was fed into the second reslurrying vessel 11 wherein it was dispersed in a continuous feed of filtrate from the final rotary vacuum filter 14. The slurry from vessel 11 was pumped continuously into the third rotary vacuum filter 12 and the cake, containing 0.077% of H₂SO₄ and 6.9% of water was fed into the third reslurrying vessel 13 wherein it was dispersed in a feed 16 of 224 parts/hour of cold water. The resultant slurry was pumped continuously to the fourth rotary vacuum filter 14 on which it was filtered to give 317 parts/hour of a substantially pure product 17 containing 98% of sulphamic acid and 2% of water. If the demand should be for a less pure product, one or more of the reslurrying stages may be omitted. An appreciable growth in crystalline particle size occurs during the purification when carried out in the manner described, as is shown by sieve analyses of crystals from each of the filtration stages.

|  | 1 | 2 | 3 | 4 |
|---|---|---|---|---|
| Percent retained on 60 mesh | 0.7 | 3.2 | 2.3 | 0.7 |
| Percent retained on 80 mesh | 7.0 | 16.2 | 31.7 | 36.5 |
| Percent retained on 100 mesh | 13.0 | 30.6 | 30.5 | 40.1 |
| Percent retained on 200 mesh | 69.3 | 44.1 | 31.9 | 22.7 |
| Percent passing 200 mesh | 8.5 | 3.9 | 1.8 | Nil |

Example 2 (with reference to FIG. 1)

Into a cooled and stirred reactor 21 maintained at a temperature of 40° C. and containing preformed sulphamic acid slurry were metered continuously 100 parts/hour of urea 22 and 588 parts/hour of 98% sulphuric acid 23. A stream of sulphur trioxide diluted with dry air and containing 5% by volume of SO₃ was delivered at a flow rate of 20,000 standard cubic feet per hour through the sparging line 24 by means of a rotary compressor. The SO₃ stream used was the normal gas stream of a contact plant for the manufacture of sulphuric acid. The sulphuric trioxide readily dissolved in thereaction slurry and the effluent gases, including the carbon dioxide produced in the reaction were scrubbed in the sulphuric acid tower 25 before releasing to atmosphere. The mean residence time of the reactants within the reaction vessel was maintained at 48 hours by means of a level controller, and the slurry overflowing from the reactor passed through the same sequence of maturing and purification stages as described in Example 1. The slurry from the dilution vessel 27 has a filtration rate of 0.76 gm./cm.²/minute, and the crude cake from the first rotary vacuum filter 28 contained 12.3% of $H_2SO_4$ and 9.8% of water. From the fourth rotary vacuum filter 34 was obtained a yield of 319 parts/hour of a technical grade of sulphamic acid containing 0.8% of $H_2SO_4$ and 2.1% of water.

Example 3 (with reference to FIG. 2)

Into a stirred reactor 21 maintained at a temperature of 80° C. and containing pre-formed sulphamic acid slurry were metered continuously 100 parts/hour of urea 22 and 800 parts/hour of 29% oleum 23. The capacity of the reaction vessel was such that the mean residence time of the reactants therein was 10 hours, and the content of unreacted urea was 0.2%. The $CO_2$ evolved was passed through the oleum scrubber 24 to remove traces of $SO_3$ before releasing to atmosphere. The reaction slurry overflowed continuously into a second stirred vessel 25 provided with a heat exchanger in which it was diluted with filtrate from the second rotary vacuum filter 28. The diluted slurry had a filtration rate of 2.63 gm./cm.²/minute. From the dilution vessel the slurry was pumped to the first rotary vacuum filter 26 and the filtrate therefrom 750 lb./hour containing 70% of $H_2SO_4$ and 0.19% of dissolved sulphamic acid was pumped to storage 35 for sale as such. The filter cake containing 4.6% of $H_2SO_4$ and 91% of sulphamic acid, was fed continuously into the reslurrying vessel 27 wherein it was dispersed in combined recrystallisation and wash liquors from the recycle liquor tank 32. The slurry from vessel 27 was pumped continuously to the second rotary vacuum filter 28 and the product therefrom containing 97.1% of sulphamic acid, 0.9% of $H_2SO_4$ and 2% of water was acceptable for many applications without further purification. As however a particularly pure product was required the cake was fed continuously into the dissolving vessel 29 wherein it was dissolved in combined recrystallisation and wash liquors supplied from vessel 32, and heated to 60° C. The hot aqueous solution was pumped to the batch crystallisers 30 and 31, which operated alternately, wherein it was cooled slowly, with agitation to 20° C. The rate of cooling was adjusted to give a product of the desired crystalline particle size distribution. At the end of each cooling cycle the mixture of crystals and mother liquor was fed to the centrifuge 34. The separated mother liquor was passed to the recycle liquor storage tank 32 for re-use in the process. The crystals in the centrifuge were washed with water 33, the water feed rate being about 260 lbs./hour, equivalent to the weight of make-up required in the process including the dilution of the slurry in vessel 25. The wash liquors were combined with the mother liquors in tank 32. The product 36 was 294 lbs./hour of substantially pure sulphamic acid containing less than 0.1% of $H_2SO_4$ and 2% of water.

I claim:
1. A process for the production of sulphamic acid which comprises: admitting urea, sulphur trioxide and sulphuric acid continuously to a reactor, withdrawing material continuously therefrom, maintaining the temperature in the reactor between 40 and 100° C., and maintaining the rates of admission of the three feed materials and the rate of withdrawal such that (a) concentration of urea in the reactor is maintained at less than 2% of the total weight of the material in the reactor, (b) the sulphur trioxide is supplied in a proportion of

$$\left(E+\frac{T}{80}\right)$$

moles per mole of urea, where E is a number between 0.30 and 1.15 and T is the numerical value of the centigrade temperature in the reactor, and the values of E and T are chosen so that $$\left(E+\frac{T}{80}\right)$$

is greater than one (c) the sulphuric acid is supplied in a sufficient stoichiometric excess to provide a proportion of liquid in the reactor of at least 30% by weight and (d) the mean residence time of material in the reactor is at least 4 hours and separating solid sulphamic acid from said material withdrawn from the reactor.

2. A process according to claim 1 wherein the mean residence time of material in the reactor is $$\frac{800R}{9T-320}$$

hours, where R is a number between 2 and 10 and T is the numerical value of the centigrade temperature in the reactor.

3. A process according to claim 2 wherein the temperature in the reactor is maintained between 40 and 80° C.

4. A process according to claim 2 wherein the concentration of urea in the reactor is less than 1% by weight.

5. A process according to claim 1 wherein E is a number between 0.55 and 0.75.

6. A process according to claim 2 wherein R is not greater than 5.

7. A process according to claim 1 wherein the temperature is maintained between 40 and 70° C., the residence time of material is maintained between 40 and 100 hours, the feed rate of $SO_3$ provides 105–125% of the stoichiometric amount needed to react with the urea, the material withdrawn from the reactor is maintained at a temperature of 40–60° C. for a period of from 8–16 hours, and solid sulphamic acid is separated from the said material.

8. A method for the production of sulphamic acid which comprises: admitting urea, sulphur trioxide and sulphuric acid continuously to a reactor and withdrawing material continuously therefrom, the rate of admission and withdrawal being such (a) as to maintain the concentration of urea in the reactor at a value of less than 2% of the total weight of the material in the reactor (b) as to maintain the concentration of liquid in the reactor of not less than 30% by weight (c) to maintain concentration of sulphur trioxide in the reactor of from 1 to 20% by weight and (d) that the mean residence time of material in the reactor is not less than 4 hours, and maintaining the temperature in the reactor at from 40° C. to 80° C. and separating solid sulphamic acid from said material withdrawn from the reactor.

References Cited

UNITED STATES PATENTS

| 2,191,754 | 2/1940 | Cupery | 23—166 |
| 2,390,648 | 12/1945 | Hill | 23—166 |
| 2,880,064 | 3/1959 | Harbaugh et al. | 23—166 |
| 3,051,551 | 8/1962 | Ferlin et al. | 23—166 |

EARL C. THOMAS, *Primary Examiner.*

ARTHUR J. GREIF, *Assistant Examiner.*